(12) United States Patent
Boudreaux et al.

(10) Patent No.: US 7,128,476 B1
(45) Date of Patent: Oct. 31, 2006

(54) PHOTONIC INTEGRATED CIRCUIT AND METHOD OF FABRICATING SAME

(75) Inventors: Paul John Boudreaux, Lanham, MD (US); Duane Anthony Satorius, Fulton, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 236 days.

(21) Appl. No.: 10/923,176

(22) Filed: Aug. 20, 2004

(51) Int. Cl.
*G02B 6/36* (2006.01)

(52) U.S. Cl. .................. 385/93; 385/92; 385/52; 385/49; 385/35; 385/33

(58) Field of Classification Search .......... 385/31, 385/33, 34, 38, 39, 52, 49, 88, 89, 92, 93, 385/94, 35
See application file for complete search history.

(56) References Cited

U.S. PATENT DOCUMENTS

| | | | |
|---|---|---|---|
| 4,433,898 A * | 2/1984 | Nasiri | 385/91 |
| 5,293,438 A * | 3/1994 | Konno et al. | 385/35 |
| 5,499,311 A | 3/1996 | DeCusatis | 385/89 |
| 5,771,323 A * | 6/1998 | Trott | 385/35 |
| 5,940,564 A * | 8/1999 | Jewell | 385/93 |
| 6,137,929 A | 10/2000 | Rosenberg et al. | 385/31 |
| 6,215,925 B1 * | 4/2001 | Kaneyama | 385/35 |
| 6,250,820 B1 | 6/2001 | Melchior et al. | 385/89 |
| 6,549,704 B1 * | 4/2003 | Ukrainczyk | 385/33 |
| 6,928,226 B1 * | 8/2005 | Caracci et al. | 385/137 |

* cited by examiner

*Primary Examiner*—Brian M. Healy
(74) *Attorney, Agent, or Firm*—Jennifer P Ferragut

(57) ABSTRACT

A photonic integrated chip having low insertion loss and facilitating alignment of the optical fiber with an optical device, preferably a waveguide or optical detector. The photonic integrated chip includes an optical fiber having a substantially spherical lens attached to one end. The device includes an etched via that receives the spherical lens attached to the optical fiber. An optical device is aligned with the via opposite the spherical lens such that light transmitted through the spherical lens is transmitted to the optical device. An anti-reflection coating is preferably applied on the end of the optical device abutting the via and the surface of the spherical lens to reduce scattering and insertion loss during transmission of data from the spherical lens to the optical device. Index matching fluid is alternatively disposed between the spherical lens and the via for this same purpose.

29 Claims, 2 Drawing Sheets

PHOTONIC INTEGRATED CIRCUIT AND METHOD OF FABRICATING SAME

FIELD OF THE INVENTION

This invention relates to integrated optical circuits and, more specifically, to integrated optical circuits having optical couplers.

BACKGROUND OF THE INVENTION

Fiber optic technology is based on the transmission of data using optical or light signals along a small optical fiber. This technology is currently being used in a variety of computer and communications applications due to the increased bandwidth allowing higher data rates through optical fibers as compared to traditional copper wire transmission methods. However, since computers and communications devices still operate using electrical signals, the optical signals received via the optical fibers must be translated to electrical signals, and the electrical signals transmitted by the devices must be translated to optical signals for communication over the optical fibers. This function is typically performed by various photo detectors, transceivers and optical/electrical converters, these optical devices being included within photonic integrated chips to which the optical fibers are coupled.

For effective signal conversion, the optical fibers must be precisely aligned with appropriate devices, such as photo detectors, within the photonic integrated chips for translation of the optical signal. Failure to precisely align the optical fiber with the photo detectors will result in optical loss and consequent loss of portions of the communicated optical signal. As an optical fiber is brought into alignment with the photo detector (or other device) it has unrestricted movement in all six degrees of freedom, the six degrees of freedom being lateral movement in the x and y directions, forward/backward movement in the z direction, rotation along the z axis, tilt along the x axis and tilt along the y axis. Because of the amount of unrestricted motion, it is extremely difficult to align the optical fibers with the photo detectors. The fact that the optical fibers are extremely small and the alignment must be precise for effective transfer adds to this complexity. In fact, the task is so complex and the necessity of precise alignment is so critical, in many cases the task cannot be performed by automated means but instead must be performed manually by skilled technicians. The only alternative is to install complicated alignment means within the system to aid alignment, adding significant expense. Also, because alignment of the additional devices needs to be as precise as alignment of the optical fibers, many of these adjustment devices still result in misalignment of optical fibers due to misalignment of the adjustment devices.

U.S. Pat. No. 5,499,311, entitled "RECEPTACLE FOR CONNECTING PARALLEL FIBER OPTIC CABLES TO A MULTI-CHIP MODULE," discloses a connector and receptacle for connecting optical fibers to a multi-chip module. The receptacle is a plastic body having holes for receiving the optical fibers. The body is surrounded by a jacket having a thermal expansion joint. The recess also has alignment holes at the bottom for receiving metal pins located on the connector that also holds the optical fibers. As the connector holding the optical fibers is brought into contact with the receptacle, the metal pins are inserted into the alignment holes aligning the optical fibers with the holes for receiving the optical fibers. The present invention does not align optical fibers in this manner. U.S. Pat. No. 5,499,311 is hereby incorporated by reference into the specification of the present invention.

U.S. Pat. No. 6,137,929, entitled "SYSTEM AND METHOD FOR INTERFACING OPTICAL FIBERS WITH OPTICAL COMMUNICATIONS DEVICE VIA AN OPTICAL FIBER FACEPLATE," discloses a connector for transmitting optical signals to an optical fiber communications device. The connector has optical fibers of larger diameter than the optical fibers to which it is connected. This obviates the need for precise alignment of either the fibers or the connector. The present invention does not rely on enlarged connecting fibers for alignment, and thus does not use the method of this invention. U.S. Pat. No. 6,137,929 is hereby incorporated by reference into the specification of the present invention.

U.S. Pat. No. 6,250,820, entitled "ELECTROOPTICAL COUPLING COMPONENT," discloses a system that couples two electrooptical components by mating indentations and protrusions on the two components. Specifically, a first substrate having optical waveguides has a trapezoidal indentation. A second substrate having optical fibers further includes a trapezoidal protrusion and recesses for the waveguides. The first substrate can be slidingly mated with the second substrate such that the trapezoidal indentation and protrusion interlock, thereby aligning the waveguides and recesses. This method of alignment is not used in the present invention. U.S. Pat. No. 6,250,820 is hereby incorporated by reference into the specification of the present invention.

As can be seen from the prior art, to align optical fibers with waveguides, photo detectors or other suitable devices it is generally necessary to precisely align other components as well. Though other alternatives may exist, these can result in optical losses from other areas and are not suitable for applications that have strict space limitations. It is therefore desirable in the art to have an alignment architecture providing a low optical loss that can be aligned using a simple optical means.

SUMMARY OF THE INVENTION

It is an object of the present invention to provide a photonic integrated chip with low optical loss.

It is a further object of the present invention to provide a photonic integrated chip with low optical loss with precisely aligned optical fibers.

It is another object of the present invention to provide a photonic integrated chip with low optical loss with precisely aligned optical fibers that can be produced using an automated process.

It is yet another object of the present invention to provide a photonic integrated chip with low optical loss with precisely aligned optical fibers that can be produced using an automated process by limiting the degrees of freedom of movement of the optical fiber during alignment.

The present invention is a photonic integrated chip and a method for manufacturing the same. The photonic integrated chip includes at least one optical fiber having a spherical lens on one end. The photonic integrated chip also includes an opto-electronic device having at least one via for receiving the spherical lens of the optical fiber. The via is preferably conical or tetrahedral. A waveguide or detector is located within the photonic integrated circuit on one side of the via opposite the spherical lens. The spherical lens is connected to the optical fiber and the photonic integrated circuit within the via and is attached to the device using epoxy. To minimize optical loss an anti-reflective coating is preferably used on the exposed surface of the waveguide or detector and on the spherical lens. To further reduce optical loss, index matching fluid can be used to focus the light emitted from the optical fiber through the spherical lens.

DETAILED DESCRIPTION OF THE PREFERRED EMBODIMENT

Figure 1:
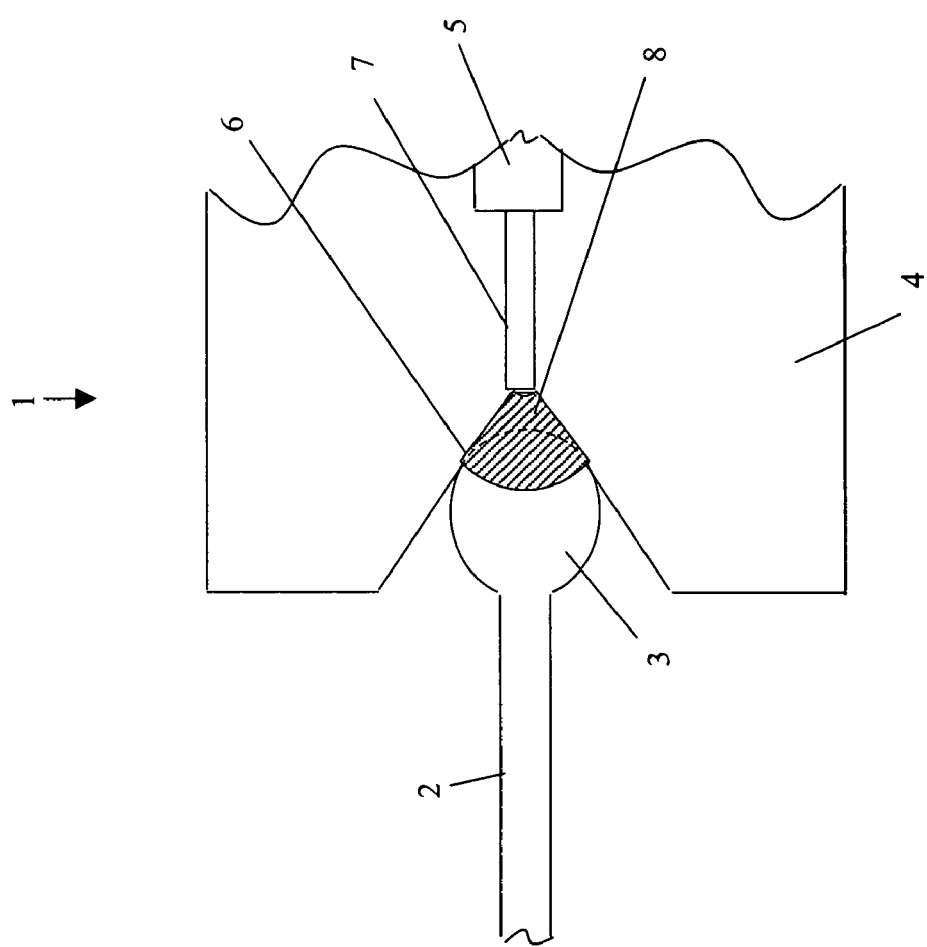
FIG. 1 is a cross-sectional view of the photonic integrated circuit of the present invention.

The present invention is a photonic integrated circuit. FIG. 1 is a cross-sectional view of the device of the present invention. The photonic integrated circuit 1 includes at least one optical fiber 2. Although the preferred embodiment will be shown in relation to a single optical fiber, it will be readily understood by those skilled in the art that this invention is equally useful for connection of multiple optical fibers. The optical fiber 2 can be any conventional optical fiber, many of which are well known and commonly used in the art. In the preferred embodiment, the optical fiber 2 is approximately 125 microns in diameter. In a further preferred embodiment, the optical fiber 2 is a single mode fiber having a core diameter of approximately 10 microns centered within the fiber and surrounded by a cladding. In an alternative embodiment the optical fiber 2 is a multimode fiber having a core diameter of approximately 62.5 microns, the core being centered within the fiber and surrounded by a cladding. The structure of optical fibers are well known to those in the art and will not be discussed in detail in reference to this invention.

A spherical lens 3 is connected to one end of the optical fiber 2. The spherical lens 3 is a preferably substantially spherical refractive lens. In an alternative embodiment the lens may be an oblong or a conical lens. In the preferred embodiment the spherical lens 3 is a thermally formed glass lens. Additionally, as would be obvious to one skilled in the art it is critical that the optical properties of the optical fiber 2 and the spherical lens 3 are compatible. This can be achieved by performing processes such as expansion matching the spherical lens 3 to the optical fiber 2, as would be obvious to one of skill in the art. The spherical lens 3 can be connected to the optical fiber 2 using any conventional means, such as connecting the spherical lens 14 to the optical fiber 2 using an epoxy. Alternatively, one end of an optical fiber can be heated causing a sphere or oblong shape to develop at that end of the optical fiber. Another method is to use a heated crucible or stainless steel form, place an end of an optical fiber into the form causing the end of the fiber to take the shape of the form. This method is especially preferred for forming conical lenses. In addition, a commercially available spherical lens-optical fiber combination, such as Corning OptiFocus™ Collimating Lensed Fiber, could be used to obviate the need for connection of the optical fiber 2 to the spherical lens 3.

The photonic integrated circuit 1 further includes a photonic chip 4. A photonic chip 4 is a preferably a support structure capable of supporting optical devices. In the preferred embodiment the photonic chip 4 is composed of a silicon substrate, however the photonic chip 4 may be comprised of any other suitable support structure as would be obvious to one skilled in the art. Preferably the material composing the photonic chip 4 is a material that may be used to create optical devices such as waveguides and optical detectors.

The photonic integrated circuit 1 may also include a detector 5. A detector is a device that converts the optical signals received from the optical fiber 2 and spherical lens 3 into electrical signals. In the preferred embodiment the detector 5 is an optical detector, however any suitable device capable of converting optical signals to electrical signals may be used in conjunction with this invention as would be obvious to one skilled in the art. In the preferred embodiment the detector 5 is formed from the silicon substrate that comprises the photonic chip, but can be formed on any other suitable support structure as would be obvious to one of skill in the art.

At least one via 6 is defined along one surface of the photonic chip 4, the via 6 being connected to the spherical lens 3. In a preferred embodiment the via 6 is defined along an outer side of the photonic chip 4. There must be one via 6 for each spherical lens 3 to be connected to the photonic chip 4. In an alternative embodiment there are additional unused vias 6 for later connection of spherical lenses 3 and associated optical fibers 2. In the preferred embodiment, the via 6 is an aperture that is etched into the side of the photonic chip 4 for receiving the spherical lens 3. Many methods of etching features into silicon substrates are well known and commonly used in the art, such as using combinations of chemicals such as hydrogen fluoride and nitric acid to etch features into substrates, and any such method could be used in conjunction with this invention. The via 6 is preferably conical, pyramidal or tetrahedral, but can be any shape into which the spherical lens 3 will fit. In a more preferred embodiment the via 6 is a three-sided tetrahedron. The spherical lens 3 can be connected to the via 6 using any conventional method, such as connecting the two components using epoxy. In the preferred embodiment, a UV curable epoxy is applied to both the optical fiber 2 and the photonic chip 4 at the surface of the photonic chip 4 at the site of the via 6 and the epoxy is appropriately cured to connect the components.

The photonic integrated circuit 1 further preferably includes at least one waveguide 7. A waveguide 7 is aligned with each via 6 such that when light is emitted through the spherical lens 3 that is connected to the via 6, the light is transmitted into the waveguide 7. The dimensions of the spherical lens 3, and most specifically the radius and index of refraction of the spherical lens 3, must be such that the light emitted from the spherical lens 3 is focused into the waveguide 7. As is obvious from the foregoing, there must be one waveguide 7 aligned with each via 6. In the preferred embodiment, the waveguide 7 is a silicon waveguide etched into the photonic chip 4 such that one end of the waveguide 7 abuts a via 6. Methods of etching waveguides into substrates are well known in the art, and any such conventional method could be used. Alternatively, the waveguide 7 can be formed within the photonic chip 4 through epitaxial growth and etching through conventional methods, such as the epitaxial growth and etching of a silicon germanium layer on the substrate to create a silicon germanium waveguide. The waveguide 7 is preferably square in cross-section, however it may be any other suitable shape according to user preferences. If a waveguide 7 is not included, a detector 5 is aligned with each via 6 in place of the waveguide 7. Alignment of the detector 5 is similar to alignment of the waveguide 7 as would be obvious to one skilled in the art.

An index matching fluid 8 is disposed between the spherical lens 3 and the via 6. Index matching fluid is a liquid or paste having a refractive index similar to that of the waveguide material and is used to match the index of refraction of the waveguide to reduce scattering of light and insertion loss. Index matching fluid or paste has the additional benefit of making a rough surface of an interface appear smooth to the mated device, again significantly reducing scatter. The index matching fluid 8 preferably has an index of refraction less than the spherical lens 3, however the index matching fluid 8 may have any other suitable index of refraction as would be obvious to one of skill in the art. Any conventional index matching fluid or paste may be used in conjunction with this invention. It is important to note that a fluid or paste will alter the light focusing power of the spherical lens 3. The position of the spherical lens 3 relative to the waveguide 7 or detector 5 must be calculated before hand to compensate for the existence of index matching fluid 8.

Figure 2:
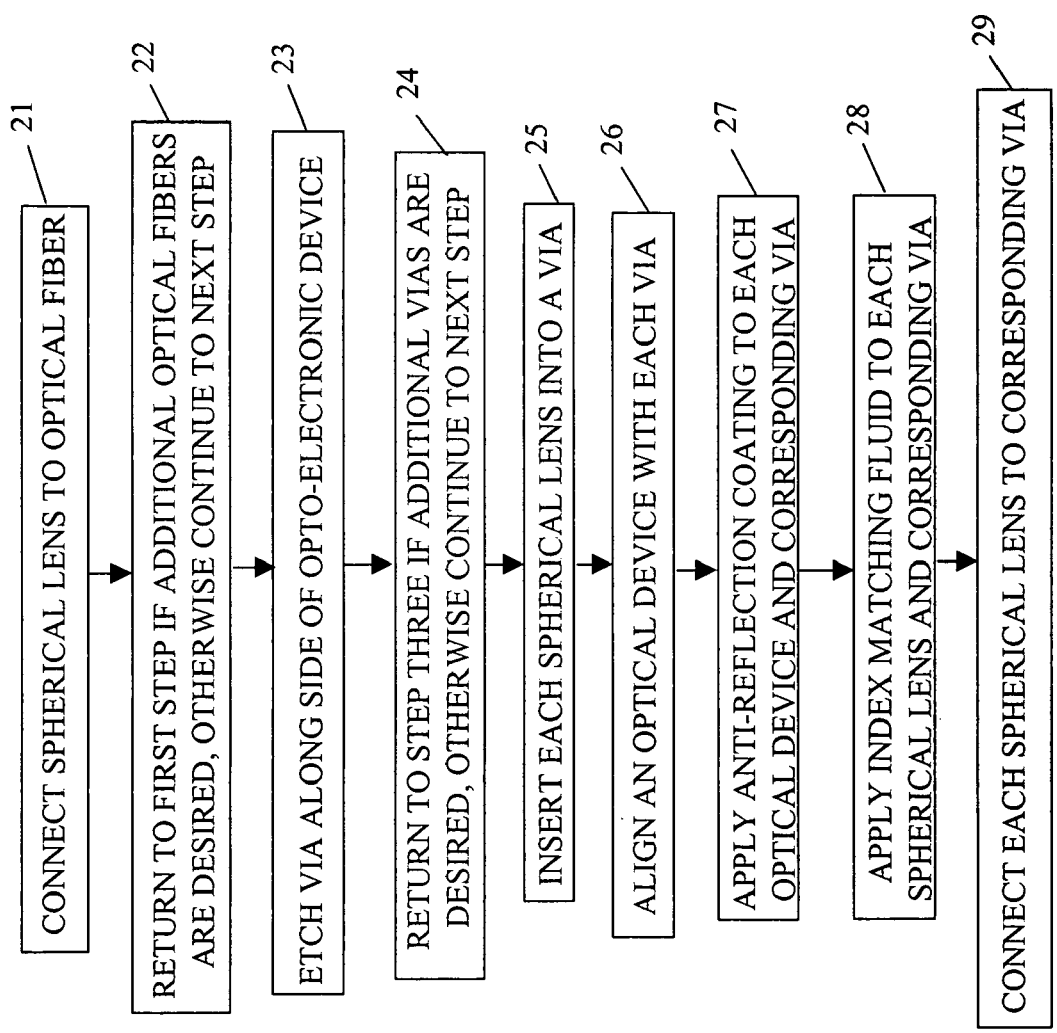
FIG. 2 is a flow chart of the steps of the method of the present invention.

The steps of the method of the present invention are shown in FIG. 2. The first step 21 of the method is connecting a substantially spherical lens to one end of an optical fiber. Methods of connecting a lens to an optical fiber are well known and commonly used in the art, and any conventional method could be used in conjunction with this invention, such as connecting the two components using a suitable epoxy. Further, any suitable substantially spherical lens could be used. Many commercially available spherical lenses would be suitable for use as the spherical lens of the preset invention, as would be obvious to one of skill in the art, or a spherical lens could be designed for use specifically with the present invention. As was explained in detail above, an alternative method is to melt the end of an optical fiber to create the spherical lens.

The second step 22 of the invention is returning to the first step 21 of the method if additional optical fibers are desired, otherwise continuing to the next step. The present invention can operate with a single optical fiber or with multiple optical fibers. If the user desires multiple optical fibers, the method returns to the first step 21 to fabricate additional optical fibers having spherical lenses until the desired number of optical fibers has been created.

The third step 23 of the method is etching a via along a side of a photonic chip. The via is preferably a tetrahedral, conical or pyramidal aperture etched into the side of the photonic chip. In a more preferred embodiment the shape of the via is a three-sided tetrahedron, this shape providing a three-point contact for precise alignment of the spherical lens of the photonic integrated circuit. The via may be any other suitable shape as desired by the user, but must have sufficient dimensions to house the spherical lens. Many methods of etching features into photonic chips are well known and commonly used in the art, such as etching using combinations of chemicals such as hydrogen fluoride and nitric acid, and any such conventional method can be used in combination with this invention.

The fourth step 24 of the method is returning to the third step 23 of the method if additional vias are desired, otherwise proceeding to the next step. For each optical fiber there is preferably one via, therefore if there were multiple optical fibers fabricated, there are preferably an equal number of vias etched. Further, in the preferred embodiment the number of vias is equal to the number of optical fibers. In an alternative embodiment, the number of vias is greater than the number of optical fibers to allow for later connection of additional optical fibers. If the user desires additional vias, the method returns to the third step 23, otherwise the method proceeds to the next step.

The fifth step 25 of the method is inserting each spherical lens into a via such that each spherical lens is housed within a via. This step requires that the number of vias be equal to or greater than the number of spherical lenses and, by extension, the number of optical fibers.

The sixth step 26 of the method is aligning an optical element with each via. An optical element is any element capable of transmitting optical signals from the optical fiber to appropriate devices on the photonic chip. In the preferred embodiment the optical device is the waveguide or the detector of the present invention. As was explained above, either the detector or the waveguide may be aligned with the via. Aligning an optical device consists of positioning the optical device with respect to the via such that when a spherical lens emits light into the via, and correspondingly into the optical device, the light is focused into, and thereby transmitted to, the optical device. The optical device can be aligned with the via using any conventional method, as would be obvious to one skilled in the art. For example, the optical device can be a prefabricated optical device, such as a prefabricated optical detector or waveguide, that is aligned with the via when being attached to the photonic chip or can be an etched device, such as an etched waveguide or optical detector, that is aligned with the via during the etching process.

The seventh step 27 of the method is applying an anti-reflection coating to the end of the optical device abutting the via and the spherical lens. As would be obvious to one skilled in the art, it may be desirable to apply the anti-reflection coating to only one of the two surfaces according to user preferences. An anti-reflective coating minimizes reflection of the light emitted from the optical fiber that enters the optical device, thus reducing scatter and optical loss. Many anti-reflection coatings are well-known and commonly used in the art and any conventional anti-reflection coating may be used in conjunction with the present invention.

The eighth step 28 of the method is applying indexing matching fluid to each spherical lens and corresponding via. As was explained in detail above, index matching fluid may be used to reduce scatter and insertion loss. As is obvious from the sixth step 26, if index matching fluid is used, it would only be used in vias housing spherical lenses. If a via does not house a spherical lens, index matching fluid is not necessary because there are no mated components whose refractive indexes need matching.

The ninth step 29 of the method is connecting each spherical lens to its corresponding via. Each spherical lens can be connected to its corresponding via by any conventional method, as would be obvious to one of skill in the art. In the preferred embodiment the spherical lens is connected to the via using UV curable epoxy. To connect the two components using UV curable epoxy, the epoxy is applied to the portions of the optical fiber and the photonic chip at the surface of the photonic chip at the site of the via and UV light is applied to the two components until the epoxy is cured. However, any other suitable method may be used to attach the components.

The invention claimed is:

1. A method of aligning an optic fiber to a photonic chip, comprising the steps of:
    a) attaching a substantially spherical lens to a first end of an optical fiber;
    b) returning to step (a) if additional optical fibers are desired, otherwise proceeding to step (c); and
    c) attaching every spherical lens to a photonic chip having a first end, top side and bottom side and comprising a substrate and a user-definable number of optical devices, wherein the spherical lens is attached such that it is housed entirely within a first end of the photonic chip.

2. The method of claim 1, further including the step of etching at least one via in the photonic chip such that the via is not accessible from the top side or bottom side of the photonic chip.

3. The method of claim 2, wherein the step of attaching every spherical lens comprises attaching every spherical lens to a photonic chip having a first end, top side and bottom side and comprising a substrate and a user-definable number of optical devices, wherein the spherical lens is attached such that it is housed entirely within a first end of the photonic chip by attaching one spherical lens to one at least one via of the opto-electronic device, wherein the spherical lens is attached to the photonic chip by guiding the spherical lens into the photonic chip by sidewalls of the via such that the photonic chip is housed entirely within the via after attachment.

4. The method of claim 3, further including the step of aligning an optical device with every at least one via, wherein the optical device is aligned with an apex of the via and is formed on the top side of the photonic chip.

5. The method of claim 4, wherein the step of attaching every spherical lens to the photonic chip comprises attaching every spherical lens to a photonic chip having a first end, top side and bottom side and comprising a substrate and a user-definable number of optical devices, wherein the spherical lens is attached such that it is housed entirely within a first end of the photonic chip by attaching one spherical lens to one at least one via of the photonic chip, wherein the spherical lens is attached to the photonic chip by guiding the spherical lens into the photonic chip by sidewalls of the via such that the photonic chip is housed entirely within the via after attachment, such that each spherical lens is aligned with one optical device.

6. The method of claim 5, further including the step of applying epoxy to every optical fiber and the photonic chip at the regions of the photonic chip contacting the optical fibers.

7. The method of claim 6, further including the step of curing the epoxy.

8. The method of claim 7, further including the step of applying an anti-reflection coating to at least one optical device.

9. The method of claim 7, further including the step of applying an index matching fluid to every via.

10. The method of claim 8, further including the step of applying an index matching fluid to every via.

11. The method of claim 10, wherein the shape of the at least one via is conical.

12. The method of claim 11, wherein the optical device is chosen from the group of optical devices consisting of waveguides, optical detectors, optical/electrical converters, and any other suitable optical devices.

13. A photonic integrated circuit comprising:
a) a photonic chip having a first end, a top side and a bottom side, wherein said photonic chip includes a substrate and a user-definable number of optical devices; and
b) at least one optical fiber having a first end and a second end, said first end including a substantially spherical lens said spherical lens being attached to said photonic chip such that said spherical lens is housed entirely within said first end of said photonic chip.

14. The photonic integrated circuit of claim 13, wherein said photonic chip includes at least one optical device.

15. The photonic integrated circuit of claim 14, wherein said at least one optical device is aligned with said spherical lens of said at least one optical fiber.

16. The photonic integrated circuit of claim 15, wherein said photonic chip includes at least one via in said first end of said photonic chip having a first side and a second side, said second side of said via having an apex aligned with said optical device and said via being inaccessible from said top side and said bottom side of said photonic chip and each said spherical lens being housed entirely within a via.

17. The photonic integrated circuit of claim 16, wherein each said at least one spherical lens is attached to said photonic chip at a said first side of said at least one via and each said at least one optical device is attached to a said second side of said at least one via such that each said at least one spherical lens is aligned with one said at least one optical device.

18. The photonic integrated circuit of claim 17, further including epoxy on the portions of said at least one optical fiber and said photonic chip which are in contact.

19. The photonic integrated circuit of claim 18, wherein the shape of said at least one via is conical.

20. The photonic integrated circuit of claim 19, further including an antireflection coating on the portions of each of said at least one optical device that is in contact with said at least one via.

21. The photonic integrated circuit of claim 19, further including an antireflection coating on each of said at least one spherical lens.

22. The photonic integrated circuit of claim 20, further including an antireflection coating on each of said at least one spherical lens.

23. The photonic integrated circuit of claim 22, further including index matching fluid on the portions of each of said at least one spherical lens and said at least one via that are in contact.

24. The photonic integrated circuit of claim 23, further including index matching fluid on the portions of each of said at least one spherical lens and said at least one via that are in contact.

25. The photonic integrated circuit of claim 24, wherein said at least one optical fiber is 125 microns in diameter.

26. The photonic integrated circuit of claim 25, wherein said epoxy is curable by ultra-violet light.

27. The photonic integrated circuit of claim 26, wherein said index matching fluid has an index of refraction less than the index of refraction of said at least one spherical lens and equal to or less than said at least one waveguide.

28. The photonic integrate circuit of claim 27, wherein said at least one waveguide is a silicon waveguide.

29. The photonic integrated circuit of claim 28, wherein said at least one optical device is chosen from the group of optical devices consisting of, waveguides, optical detectors, optical/electrical converters and any other suitable photonic device.

* * * * *